(12) United States Patent
McCarthy et al.

(10) Patent No.: US 8,429,123 B2
(45) Date of Patent: Apr. 23, 2013

(54) SYNCHRONIZATION IMPROVEMENTS

(75) Inventors: Brendan A. McCarthy, San Francisco, CA (US); Carsten Guenther, San Francisco, CA (US)

(73) Assignee: Apple Inc., Cupertino, CA (US)

(*) Notice: Subject to any disclaimer, the term of this patent is extended or adjusted under 35 U.S.C. 154(b) by 298 days.

(21) Appl. No.: 12/235,539

(22) Filed: Sep. 22, 2008

(65) Prior Publication Data

US 2009/0307281 A1     Dec. 10, 2009

Related U.S. Application Data

(60) Provisional application No. 61/059,733, filed on Jun. 6, 2008.

(51) Int. Cl.
*G06F 7/00* (2006.01)
(52) U.S. Cl.
USPC .......................................................... 707/618
(58) Field of Classification Search .................. 707/618, 707/620, 621
See application file for complete search history.

(56) References Cited

U.S. PATENT DOCUMENTS

| 7,155,488 | B1 | 12/2006 | Lunsford et al. |
| 7,752,166 | B2 | 7/2010 | Quinlan et al. |
| 2002/0073139 | A1 | 6/2002 | Hawkins et al. |
| 2002/0120696 | A1* | 8/2002 | Mousseau et al. ............ 709/206 |
| 2004/0205263 | A1 | 10/2004 | Sivaraman et al. |
| 2008/0027996 | A1* | 1/2008 | Morris .......................... 707/200 |
| 2008/0109494 | A1 | 5/2008 | Chitre et al. |
| 2008/0270629 | A1 | 10/2008 | Yang et al. |
| 2009/0187622 | A1 | 7/2009 | Xie |

OTHER PUBLICATIONS

SyncML Sync Protocol, version 1.1 [Online], Feb. 15, 2002 [Retrieved on Sep. 9, 2020 by Examiner in related P6501 application], syncML Initiative [Retrieved from: http://www.openmobilealliance.org/tech/affiliates/syncml/syncml_sync_protocol_v1120020215.p.

* cited by examiner

*Primary Examiner* — Truong Vo
(74) *Attorney, Agent, or Firm* — Blakely, Sokoloff, Taylor & Zafman LLP

(57) ABSTRACT

Synchronization architectures, methods, systems, and computer readable media are described. In one embodiment, a synchronization session is initiated between a first data processing system and a second data processing system. First data, representing changes to a first data class, is transmitted from the first data processing system to the second data processing system. Second data, representing changes to a second data class, is transmitted from the first data processing system to the second data processing system. Transmission of the second data begins before transmission of the first data is complete. The first data may comprise structured data such as contacts information, to do information, calendar information, or web browsing bookmarks.

22 Claims, 13 Drawing Sheets

SYNCHRONIZATION IMPROVEMENTS

This application claims priority to co-pending U.S. Provisional Patent Application No. 61/059,733 filed on Jun. 6, 2008, which provisional application is incorporated herein by reference in its entirety; this application claims the benefit of the provisional's filing date under 35 U.S.C. §119(e).

RELATED APPLICATIONS

The present application is related to the following commonly-owned, concurrently-filed applications: application Ser. No. 12/235,537, filed Sep. 22, 2008, entitled, "Synchronization Improvements," application Ser. No. 12/235,542, filed Sep. 22, 2008, entitled "Synchronization Improvements," and application Ser. No. 12/235,544, filed Sep. 22, 2008, entitled "Synchronization Improvements."

FIELD OF THE INVENTION

The various embodiments described herein relate to systems and methods for synchronizing data between two or more data processing systems such as a desktop computer system and a handheld computer system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright© 2008, Apple Inc., All Rights Reserved.

BACKGROUND OF THE INVENTION

Synchronization is the process of maintaining consistency between two distinct datastores by periodically comparing the chances which have occurred to each since the last time they were known to be consistent. Each party to a synchronization must be capable of supplying all data stored by the party upon request, and be capable of supplying only the changes to the data stored by the party since the last completed synchronization. Each party must agree upon a scheme to be kept in sync, the manner of data representation, and the semantics of the synchronization primitives. Synchronization primitives may include adding data to a datastore, updating data in a datastore, and deleting data from a datastore. Additionally, each party must be capable of a rollback if a problem occurs during a synchronization to avoid corrupting the datastore. A rollback has the effect of placing the datastore in the state it was in before the synchronization was initiated.

Modern data processing systems, such as a general purpose computer, a handheld computer, a cellular telephone, media players, etc. have been reduced in size to the point that they can often be readily carried around by a user. Furthermore, these devices are powerful enough that they can provide substantial computing power to allow a user to maintain contact information, maintain calendar information, provide email functionality, and even provide web browsing. These devices also may include support for a task or a To Do list or database and other sources of data for a user. An example of a small handheld computer is the Apple iPhone or the Apple iPod Touch.

These handheld computers typically allow a user to synchronize their data between the handheld computer and another computer, such as the user's desktop computer, such that both computers maintain the same set of information, such as the same calendar for the user, thereby allowing the user to view their calendar on either the desktop computer or the handheld computer. The synchronization is typically performed by coupling together the host computer with a handheld computer through a mechanical and electrical connection provided by a dock.

FIG. 1 shows an example in the prior art of a handheld computer being coupled mechanically and electrically to a host computer through the dock 126. The system 110 includes the host computer 112 and the handheld computer 114. Synchronization software 116, running on the host, performs the synchronization between the respective databases, such as the contacts database 118 which is synchronized with the handheld contacts database 120. Furthermore, the synchronization software 116 synchronizes the calendar database 122 on the host computer with the handheld's calendar database 124. Other embodiments may include synchronization of databases containing to-do items, web bookmarks, photographs, videos, MP3s, notes, widgets (e.g., configuration settings for widgets), and other data types.

Certain synchronization systems are described under the name "SyncML" and further information about these systems can be found at openmobileallianceorg.

SUMMARY OF THE DESCRIPTION

Synchronization architectures, methods, systems, and computer readable media are described herein. In one embodiment, a synchronization session is initiated between a first data processing system and a second data processing system. First data, representing changes to a first data class, is transmitted from the first data processing system to the second data processing system. Second data, representing changes to a second data class, is transmitted from the first data processing system to the second data processing system. Transmission of the second data begins before transmission of the first data is complete. The first data may comprise structured data such as contacts information, to do information, calendar information, or web browsing bookmarks. The first data class and the second data class may each operate a distinct state machine. The synchronization session may use synchronization anchors exchanged between the first and the second data processing systems. The first data may comprise data changed in the data class since a prior synchronization. The first data class and the second data class may belong to a plurality of data classes. Each data class in the plurality may be synchronized in a single transport roundtrip. Data within each data class may be independent of data in other data classes. The first data may specify no changes.

Other systems and methods are also described, and computer readable media, which contain executable instructions to cause a computer to operate as described herein, are also described.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g., computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable storage medium includes any mechanism for storing information in a form readable by a machine (e.g., a computer). For example, a machine-readable storage medium includes read only memory ("ROM"); random access memory ("RAM"); magnetic disk storage media; optical storage media; flash memory devices; etc.

Figure 1:
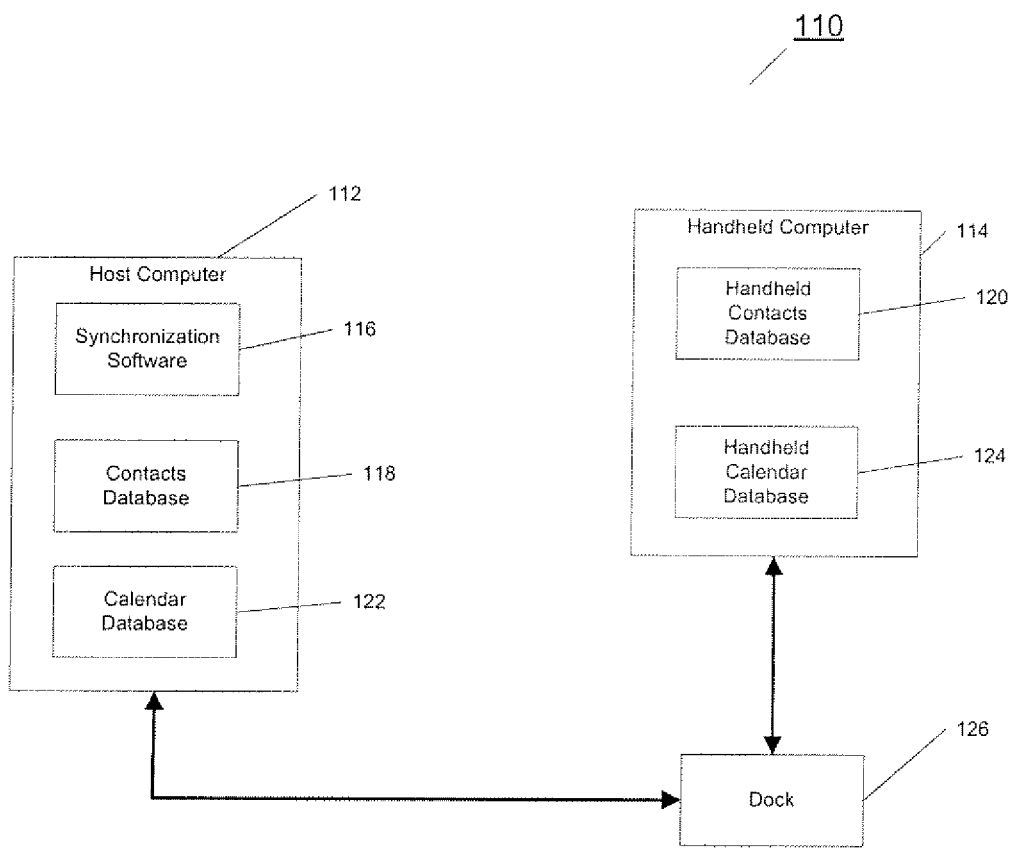
FIG. 1 shows in block diagram form an example of a prior art synchronization system.
Figure 2:
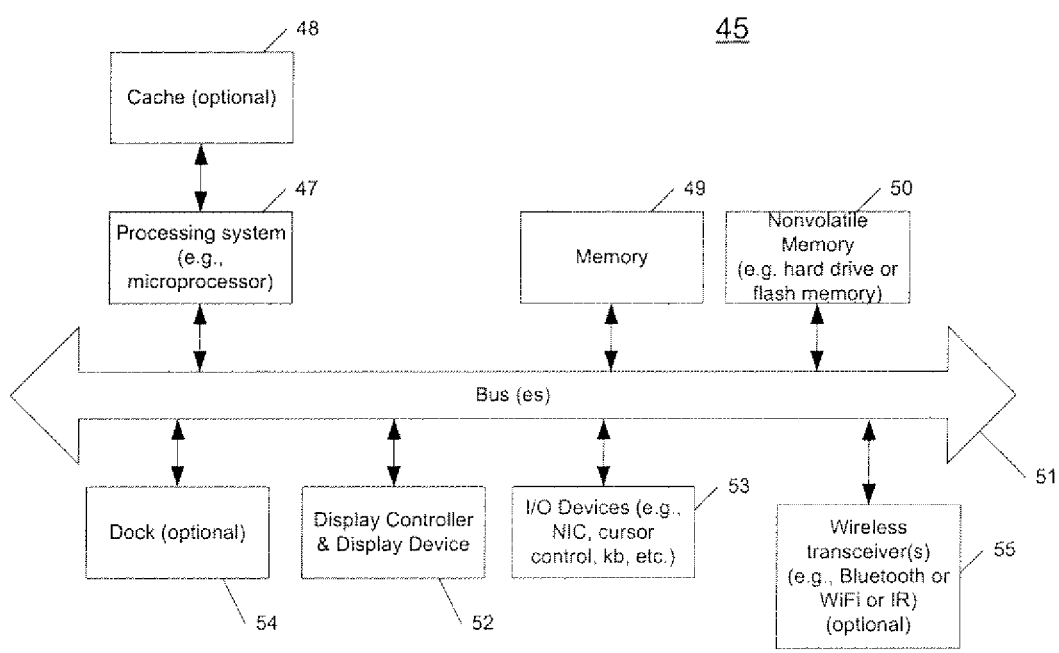
FIG. 2 shows an example of a data processing system, such as a server computer.
Figure 3:
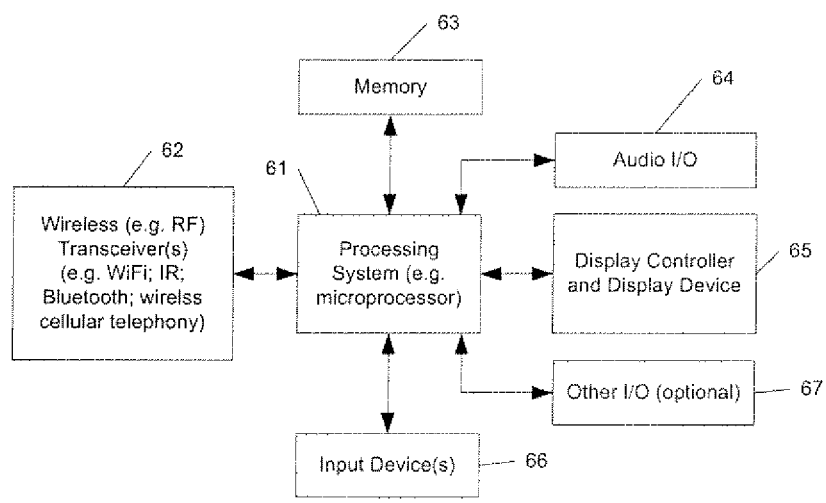
FIG. 3 shows an example of a data processing system, such as a handheld computer or other type of data processing system.

Prior to describing the various different embodiments in connection with synchronization architectures, systems, methods and machine-readable media, a brief discussion will be provided in connection with the data processing systems which may be part of the synchronization process. The term "host" and the term "device" are intended to refer generally to data processing systems rather than specifically to a particular form factor for the host versus a form factor for the device. FIGS. 2 and 3 show examples of two different data processing systems, where the system shown in FIG. 2 may be referred to as a host while the system shown in FIG. 3 may be referred to as a device, although the system shown in FIG. 2 may be referred to as a device while the system shown in FIG. 3 may be referred to as a host. The terms "handheld device" and "server" may also be used.

FIG. 2 shows one example of a computer system which is a form of a data processing system. Note that while FIG. 2 illustrates various components of a computer system, it is not intended to represent any particular architecture or manner of interconnecting the components as such details are not germane to the present inventions. It will also be appreciated that personal digital assistants (PDAs), cellular telephones, media players (e.g. an iPod), devices which combine aspects or functions of these devices (a media player combined with a PDA and a cellular telephone in one device), network computers, an embedded processing device within another device, and other data processing systems which have fewer components or perhaps more components may also be used to implement one or more embodiments of the present inventions and may be one or more of the data processing systems described herein. The computer system shown in FIG. 2 may, for example, be a Mac computer from Apple, Inc. or a computer which runs the Windows operating software from Microsoft Corporation.

As shown in FIG. 2, the computer system 45 includes a bus 51 which is coupled to one or more microprocessors which form a processing system 47. The bus 51 is also coupled to memory 49 and to a non-volatile memory 50, which may be a magnetic hard drive in certain embodiments, or flash memory in other embodiments. The bus is also coupled to a display controller and display 52 and one or more input/output (I/O) devices 53. Further, the bus is coupled to an optional dock 54 and to one or more wireless transceivers 55, which may be a Bluetooth transceiver or a WiFi transceiver or an infrared transceiver. It will be appreciated that the wireless transceivers 55 are optional as shown in FIG. 2. The processing system 47 may optionally be coupled to optional cache 48. The processing system 47 may include one or more microprocessors, such as a microprocessor from Intel or IBM. The bus 51 interconnects these various components together in a manner which is known in the art.

Typically, the input/output devices 53 are coupled to the system through input/output controllers. The memory 49 may be implemented as dynamic RAM (DRAM) which provides fast access to data but requires power continually in order to refresh or maintain the data in the memory. The non-volatile memory 50 may be a magnetic hard drive or other non-volatile memory which retains data even after power is removed from the system. While FIG. 2 shows that the non-volatile memory 50 is a local device coupled directly to the rest of the components in the data processing system, it will be appreciated that other embodiments may utilize a non-volatile memory which is remote from a system, such as a network storage device, which is coupled to the data processing system through a network interface, such as a modem or an Ethernet interface. The bus 51, as is well known in the art, may include one or more buses connected to each other through various bridges, controllers, and/or adapters as is known in the art. In one embodiment, the I/O controller 53 may include a USB adapter for controlling USB peripherals and an IEEE-1394 controller for IEEE-1394 compliant peripherals.

It will be apparent from this description that aspects of the inventions may be embodied, at least in part, in software. That is, the techniques may be carried out in a computer system or other data processing system in response to its processor or processing system executing sequences of instructions contained in a memory, such as memory 49 or non-volatile memory 50 or the memory 63 shown in FIG. 3. In various embodiments, hardwired circuitry may be used in combination with the software instructions to implement the present inventions. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize that what is meant by such expressions is that the functions result from execution of the code by a processing system.

The dock 54 and/or the wireless transceivers 55 provide a physical interface for coupling the data processing system shown in FIG. 2 to another data processing system, such as the data processing system shown in FIG. 3, or to another data processing system which resembles the system shown in FIG. 2. The dock 54 may be similar to a dock in the prior art, such as the dock 26, such that it provides both a mechanical and electrical connection between one data processing system and another data processing system to allow a synchronization process to be performed between the two systems. In other embodiments, the wireless transceivers 55 may provide an electrical connection between the two systems for the purpose of a synchronization process without providing a mechanical connection between the two systems.

FIG. 3 shows an example of another data processing system which may synchronize data with other data processing systems, such as the system shown in FIG. 2 or a system which is similar to that shown in FIG. 3. The data processing system 60 shown in FIG. 3 includes a processing system 61, which may be one or more microprocessors, or which may be a system on a chip integrated circuit, and the system also includes memory 63 for storing data and programs for execution by the processing system. The system 60 also includes an audio input/output subsystem 64 which may include a microphone and a speaker for, for example, playing back music or providing telephone functionality through the speaker and microphone. A display controller and display device 65 provide a visual user interface for the user; this digital interface may include a graphical user interface which is similar to that shown on a Mac computer when running Mac OS X operating system software or an iPhone.

The system 60 also includes one or more wireless transceivers 62, such as a WiFi transceiver, an infrared transceiver, a Bluetooth transceiver, and/or a wireless cellular telephony transceiver. It will be appreciated that additional components, not shown, may also be part of the system 60 in certain embodiments, and in certain embodiments fewer components than shown in FIG. 3 may also be used in a data processing system. The data processing system 60 also includes one or more input devices 66 which are provided to allow a user to provide input to the system. These input devices may be a keypad or a keyboard or a touch panel or a multi-touch panel. The data processing system 60 also includes an optional input/output device 67 which may be a connector for a dock, such as the dock 54 shown in FIG. 2. It will be appreciated that one or more buses, not shown, may be used to interconnect the various components as is well known in the art.

The data processing system shown in FIG. 3 may be a handheld computer or a personal digital assistant (PDA), or a cellular telephone (such as an iPhone) with PDA-like functionality, or a handheld computer which includes a cellular telephone, or a media player, such as an iPod, or devices which combine aspects or functions of these devices, such as a media player combined with a PDA and a cellular telephone in one device. In other embodiments, the data processing system 60 may be a network computer or an embedded processing device within another device, an entertainment system (e.g., a Nintendo DS, PSP, "GameBoy", etc.), a consumer electronic device, or other types of data processing systems which have fewer components or perhaps more components than that shown in FIG. 3.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

In certain embodiments, the data processing system 60 may be implemented in a small form factor which resembles a handheld computer having a tablet-like input device which may be a multi-touch input panel device which is integrated with a liquid crystal display. Examples of such devices are provided in U.S. patent application Ser. No. 11/586,862, filed Oct. 24, 2006, and entitled "AUTOMATED RESPONSE TO AND SENSING OF USER ACTIVITY IN PORTABLE DEVICES," which is assigned to the same assignee as the instant application. This foregoing application is hereby incorporated herein by reference.

In the following description, various software components which are used for both synchronization and non-synchronization processing operations are described. It will be understood that in at least certain embodiments, these various software components may be stored in the memory 49 and/or memory 50 shown in FIG. 2 for one type of data processing system, and in the case of a system such as that shown in FIG. 3, these various different software components may be stored in the memory 63 which may include volatile memory as well as non-volatile memory, such as flash memory or a magnetic hard drive.

Figure 4:
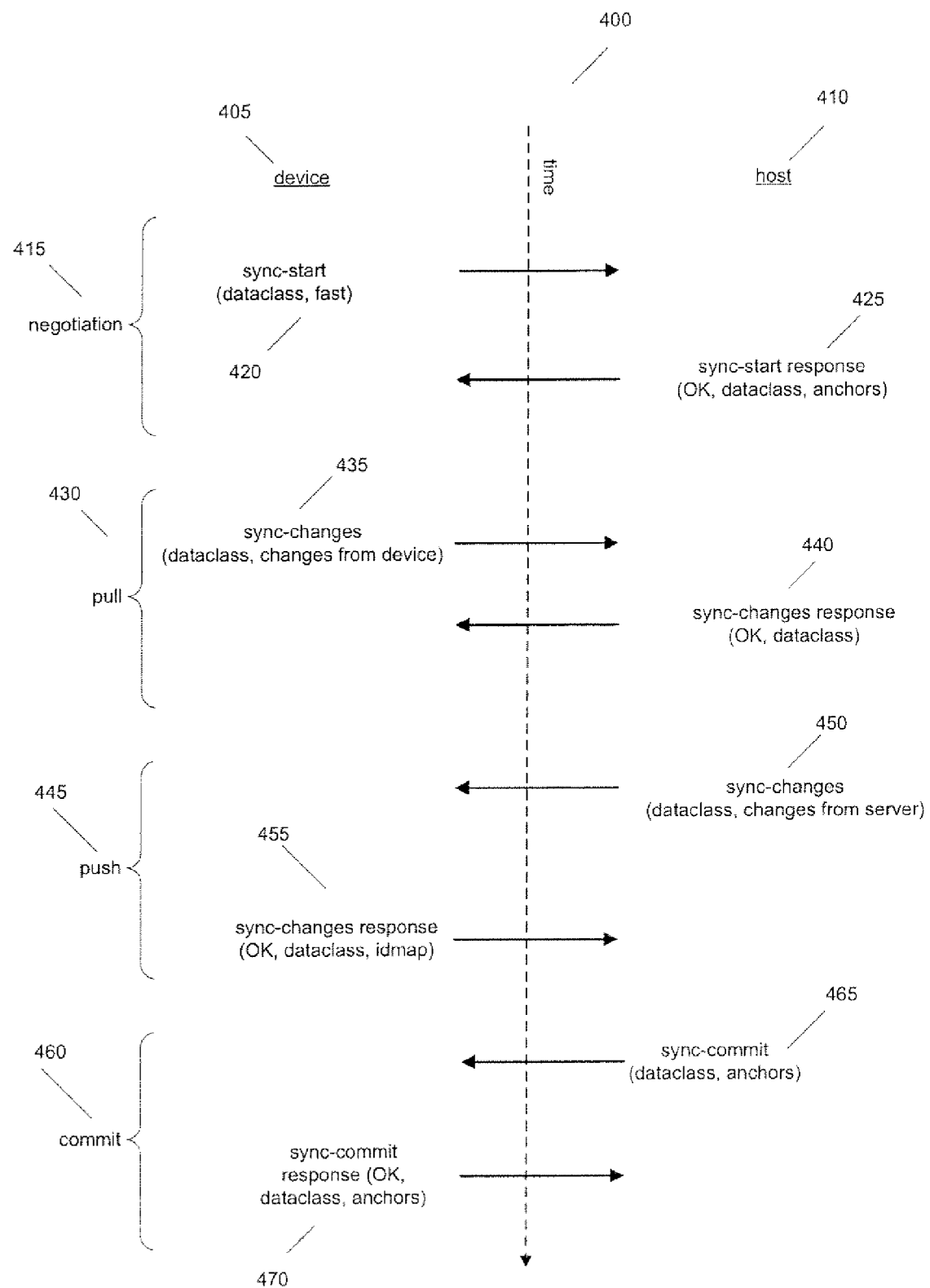
FIG. 4 is a timing diagram showing events in time between a device and a server according to one example of a synchronization process.

FIG. 4 shows a timing diagram indicating various actions and operations which occur on the host and the device over time during a typical synchronization process 400 according to at least one embodiment. The example shown in FIG. 4 is provided to give a general overview of a synchronization process; this synchronization process can be modified to use the one or more embodiments depicted in FIGS. 5-13 which are described herein. The vertical line down the center separates the actions of the device 405 and the host 410 and indicates the passage of time in the downward direction. The synchronization process is logically divided into four components: negotiation 415, pull 430, push 445, and commit 460. Negotiation 415 includes sync-start 420 and sync-start response 425. Pull 430 includes sync-changes 435 and sync-changes response 440. Push 445 includes sync-changes response 455 and sync-changes 450. Commit 460 includes sync-commit 465 and sync-commit response 470.

Negotiation 415 determines a synchronization mode for the synchronization session. Through the command sync-start 420, the device 405 requests a synchronization session with host 410 for dataclass using fast synchronization. Host 410 sends sync-start response 425 back to the device. Sync-start response 425 informs the device that the requested synchronization mode is accepted for the indicated dataclass. If the host decides, during the negotiation phase, to perform a slow synchronization, then the host's response will indicate that the device's requested synchronization mode has been rejected. Sync-start response 425 also provides anchors which are used to atomize synchronization sessions. In one embodiment, anchors may be used to further atomize elements of a synchronization session, as described in greater detail below in conjunction with FIGS. 10 and 11. Sync-start response 425 ends the negotiation phase, which is followed by pull phase 430.

During pull phase 430, device 405 transmits data to host 410. FIG. 4 depicts a synchronization mode of fast, so the data transmitted by device 405 during pull phase 430 are the changes to the dataclass since the previous synchronization. Sync-changes 435 sends the changes to the dataclass resident on the device since the last synchronization. Host responds with sync-changes response 440 which acknowledges receipt of the changes for the given dataclass. Host 410 now enters "mingle" phase (not shown), and merges any pending updates in the host database for the dataclass with the changes received from the device. The result of mingling is a set of conflicting changes and a set of updates which should be pushed to the device.

Push phase 445 occurs after the host has finished mingled the changes from the device with the host's own data. Host sends sync-changes 450 to the device, which includes changes from the server after mingling. Device responds with sync-changes response 455, acknowledging receipt of the changes and including an identifier map. Identifier maps are used to map between the local identifiers used by the device within its own data stores and the identifiers used by the host. By transmitting a mapping, the device indicates to the host that it intends to use the device's own local identifiers when referring to items to the host. The host will store the mapping and translate any references made by the device into host-based identifiers. Push phase 445 ends after the device acknowledges the server's changes.

Commit phase 460 follows push phase 445 and begins with a sync-commit 465 from the host, requesting that the device write the changes to its own data storage and update its anchor values. Device 405 acknowledges server's request by sending sync-commit response 470.

In this embodiment, a single dataclass was synchronized using fast synchronization modes. Fast synchronization allows the device and host to exchange only those changes that have occurred since the previous synchronization. Fast synchronization reduces the amount of data that needs to be sent in order to synchronize the dataclass. Another synchronization mode is the slow synchronization mode. The slow sync mode is required when the device and host first sync to establish a common baseline for subsequent difference-only data exchange, (e.g., fast sync). During a slow sync, the device sends all data for the dataclass to the server. The server attempts to match these items with those which are already known. The host then responds with the items which the device does not already have. In certain embodiments, reset sync mode resets all data for the dataclass on the device with data from the host, for instance, when data on the device is corrupted.

The following description provides embodiments which can improve the synchronization process of FIG. 4. For example, synchronization phase compression allows the device to compress distinct sync state machine phases into a single protocol message. Synchronization phase compression helps increase session robustness and efficiency. Robustness is enhanced because fewer messages need to be sent if commands are compressed into fewer messages. Efficiency is increased because less network traffic is wasted if the server does not consent to the synchronization mode proposed by the device. Synchronization phase compression may be useful in synchronizations which occur through a wireless network such as a wireless cellular telephone network which may have poor coverage or inconsistent coverage with sporadic loss of coverage.

Figure 5:
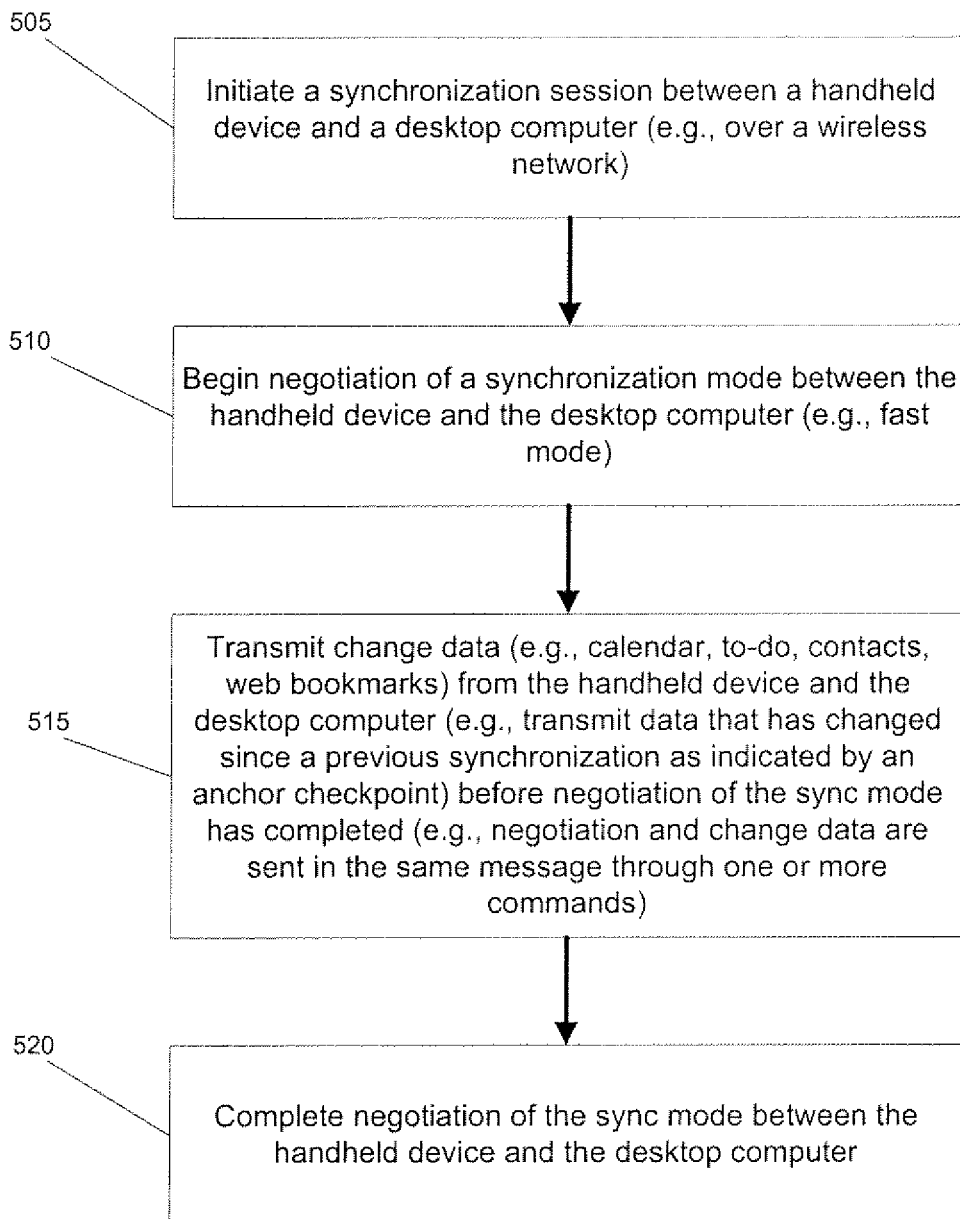
FIG. 5 is a flow chart which illustrates an embodiment of synchronization phase compression.

FIG. 5 is a flow chart which illustrates an embodiment of synchronization phase compression in which the device compresses the negotiation and pull phases together by sending sync-start and sync-changes commands for a given dataclass to the server in the same message. At block 505, the method initiates a synchronization session between a handheld device and a desktop computer or other system, over, for example, a wireless network, (e.g., cellular telephone network, 802b.11, BlueTooth, etc.) At block 510, the method begins negotiation of a synchronization mode between the device and the computer. Synchronization modes are discussed above. Synchronization negotiation is initiated through a sync-start command sent by the device to the host with the desired mode. At block 515, change data is transmitted from the handheld device to the host before the negotiation has completed. Change data is transmitted using the sync-changes command. Change data may represent changes to a particular dataclass, such as calendar data, contacts data, to-do items, web bookmarks, etc. At block 520, sync mode negotiation between device and server is completed. In certain cases, the desktop or other system may determine that a slow synchronization or a reset is required and it will reject the request for a fast synchronization and ignore the transmitted change data. While this may seem like a waste of resources (e.g., the transmission of chances was not needed), in most cases, a slow synchronization or reset is not needed.

Figure 6:
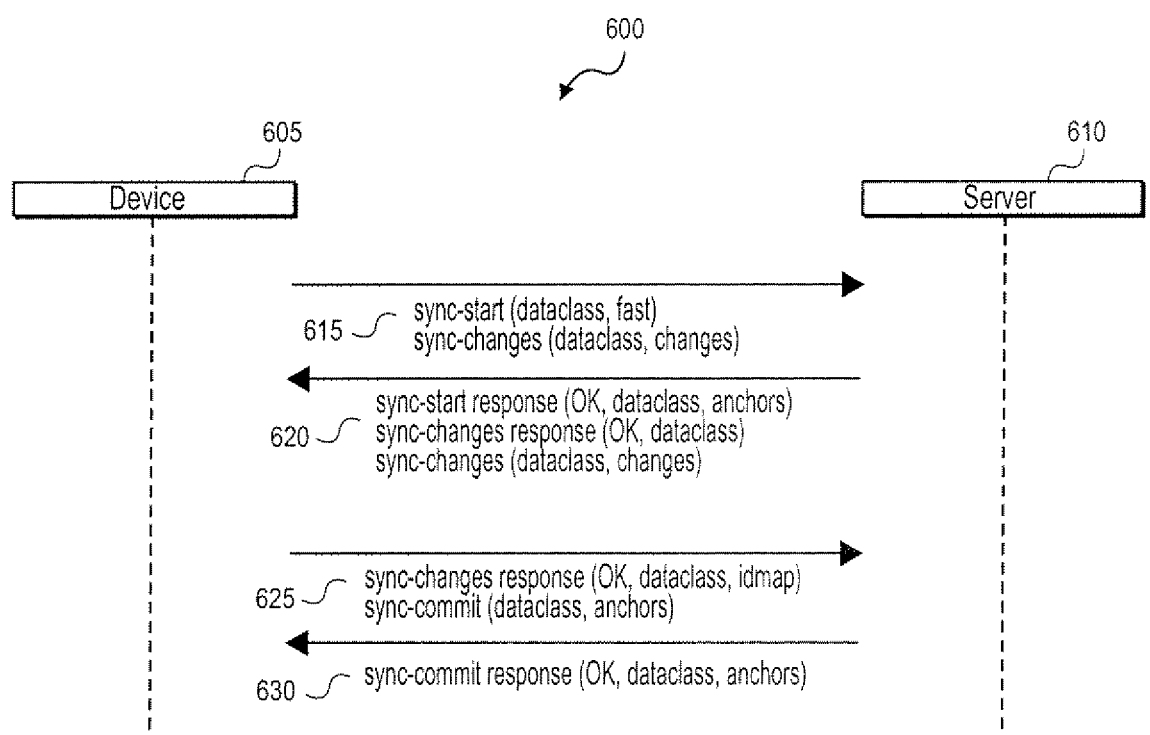
FIG. 6 is a timing diagram showing events in time between a device and server according to one embodiment of synchronization phase compression.

FIG. 6 is a timing diagram showing events in time between a device and server according to one embodiment of synchronization phase compression. Synchronization 600 contains commands exchanged between a device and a server (or other "host") over time. Passage of time correlates to moving from top to bottom on the page. Device 605 initiates a compressed synchronization phase by sending message 615 containing sync-start and sync-changes (indicating changes in data for a dataclass since the last synchronization). Server 610 responds to the device with message 620, which includes sync-start response indicating that the server agrees with device 605's proposed sync mode and dataclass; sync-changes response, which indicates that the server has received the changes sent by the device. Message 620 also includes sync-changes, which contains the mingled updates from server 610. Message 625 from the device includes sync-changes response containing an idmap corresponding to the elements of the dataclass and sync-commit to instruct the host 610 to record the data. Message 630 includes a sync-commit response from the host acknowledging the sync-commit in message 625.

The server may compress the push and commit phases by sending sync-changes and sync-commit commands for a given dataclass in the same message. Additionally, the device may omit sending the command response to sync-changes or sync-commit if the previous message was final. Any pending id mappings, if required, must be sent to the server in the subsequent sync session. If the data store for a dataclass wishes to use id mapping, it may include an idmap parameter in a command or response to a sync-changes command from the server. After receiving the idmap parameter, the server will only refer to the mapped entity using the local id by which the device refers to the mapped entity. The id mappings may be deferred from the first sync session to the second. By deferring transmission of the idmap, the first sync session may be faster and more efficient as described further below.

Figure 7:
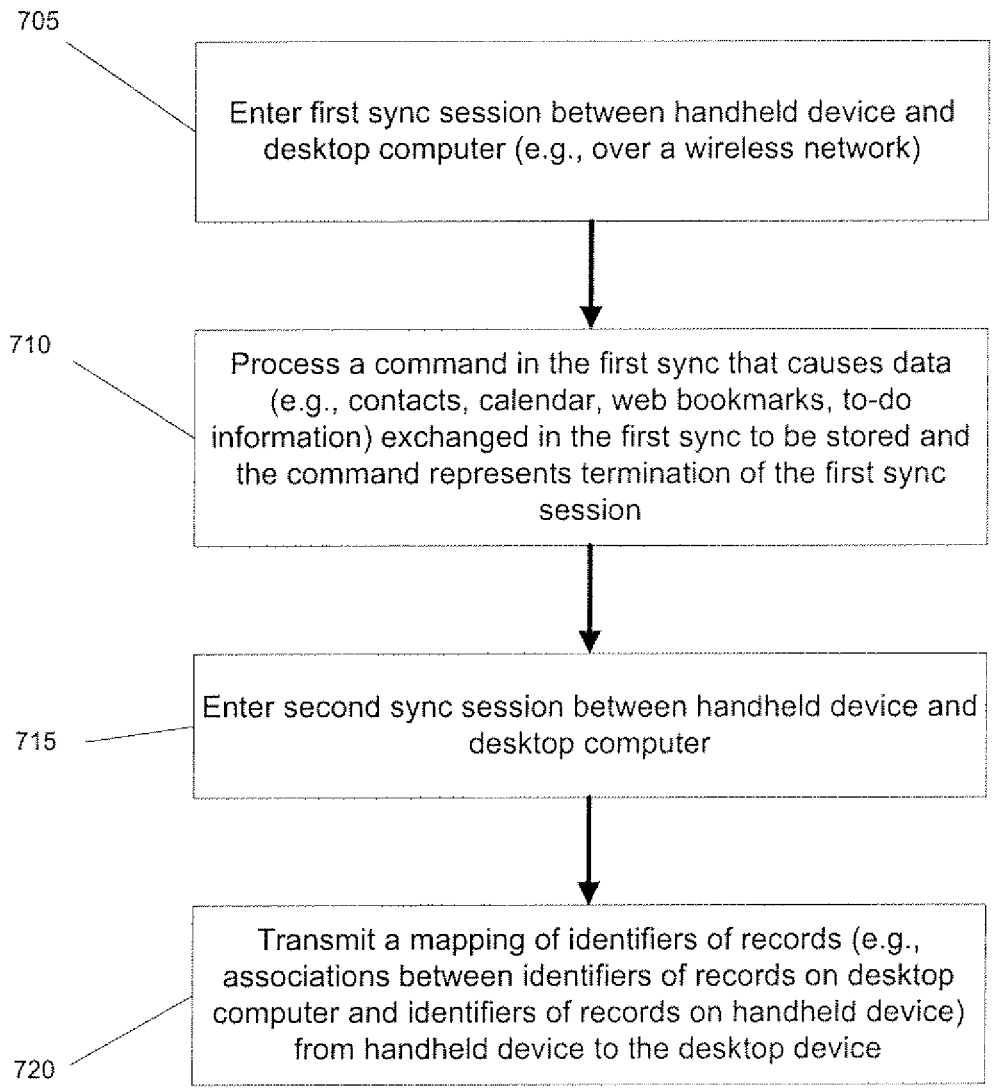
FIG. 7 is a flow chart which illustrates an embodiment of deferred identifier map transmission.

FIG. 7 is a flow chart which illustrates an embodiment of deferred identifier map transmission. At block 705, the method enters a first sync session between the handheld device and the desktop computer. At block 710, a command is processed in the first sync session that causes data (e.g., contacts, etc.) to be exchanged and stored on the handheld device. The first synchronization session is terminated. At block 715, the device and computer enter a second synchronization session. At block 720, the device transmits a mapping of identifiers of records from the handheld device to the host. It can be seen from FIG. 7 that the mapping for records synchronized in the first session is transmitted in a second session which follows, in time, from the first session.

Figure 8:
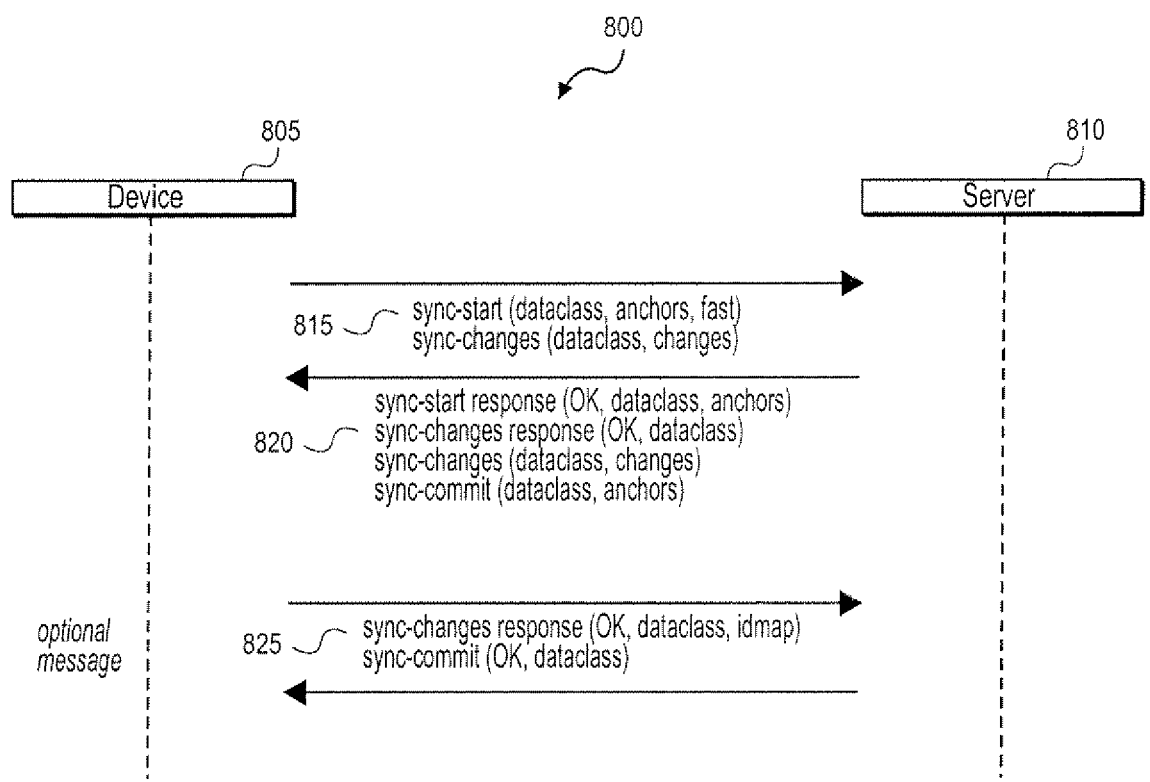
FIG. 8 is a timing diagram showing events in time between a device and a server according to one embodiment of deferred identifier map transmission.

FIG. 8 is a timing diagram showing events in time between a device and a server according to one embodiment of deferred identifier map transmission. Synchronization 800 contains commands exchanged between device 805 and server 810 over time. Passage of time is expressed from top to bottom of the figure. Device initiates the sync session by sending compressed message 815 containing sync-start and sync-changes. Server 810 responds with compressed message 820, including responses to the device's two commands and sync-changes and sync-commit containing the server's mingled changes and a request for the device to store its data. Message 825 is optional, since message 820 was final. Thus, the entire synchronization of the dataclass was performed through a single transport roundtrip.

Figure 9:
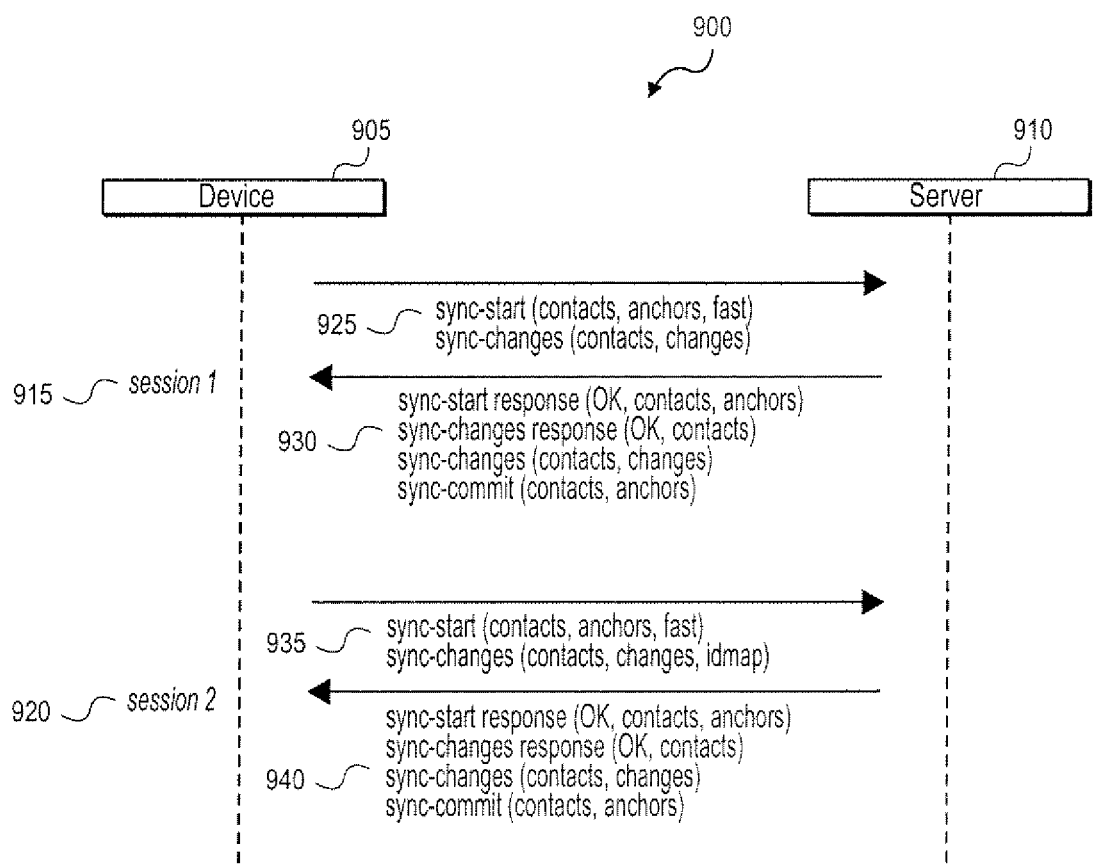
FIG. 9 is a timing diagram showing multiple session events in time between a device and a server according to one embodiment of deferred identifier map transmission.

FIG. 9 is a timing diagram showing multiple synchronization session events in time between a device and a server according to one embodiment of deferred identifier map transmission. Synchronization 900 contains commands exchanged between device 905 and host 910 over sync sessions 915 and 920. Time progresses from top to bottom. Device 905 initiates sync session 915 by sending compressed message 925 to server 910. Server 910 responds with compressed message 930, terminating session 915. At this point, all data in a dataclass which required synchronization in the first session has been synchronized. Device 905 initiates sync session 920 (a second synchronization) by sending compressed message 935. In one embodiment, an arbitrary period of time may elapse between sync session 915 and sync session 920. Message 935 includes a sync-changes command containing the idmap deferred from session 915. Server 910 responds with compressed message 940, terminating session 920.

In one embodiment, sync anchor checkpoints are used to atomize entire sync sessions. Sync anchors are implemented as opaque data which the device and server exchange. Generally, anchors are exchanged during the sync phase negotiation phase to determine the session's sync mode. During the commit phase, a new set of anchors are exchanged and persisted for use during the following sync session. By exchanging sync anchor checkpoints more frequently, within a sync session, granularity of the session is enhanced. Increased session granularity enhances robustness of the sync mechanism, as the sync may make progress over smaller increments. The device is provided with checkpoint anchors at certain points during the sync session. If the session fails, the device provides the most recent checkpoint anchor when the next sync session is initiated. This allows the device and the server to resume the synchronization where it left off. Thus, when syncing over an unreliable wireless connection sync anchor checkpoints allow the claimed invention to make synchronization progress more reliably.

Sync anchor checkpoints may be used at the end of the server mingle phase (i.e., in response to the final sync-changes command of the device.); during a split sync-change command (e.g., syncing a dataclass over multiple messages); during the commit phase. The server may expire checkpoint anchors when they are no longer needed or if the server needs the resources committed to maintaining the checkpoint state. If the device supplies an unknown or expired checkpoint anchor, the sync will fall into slow sync mode.

Figure 10:
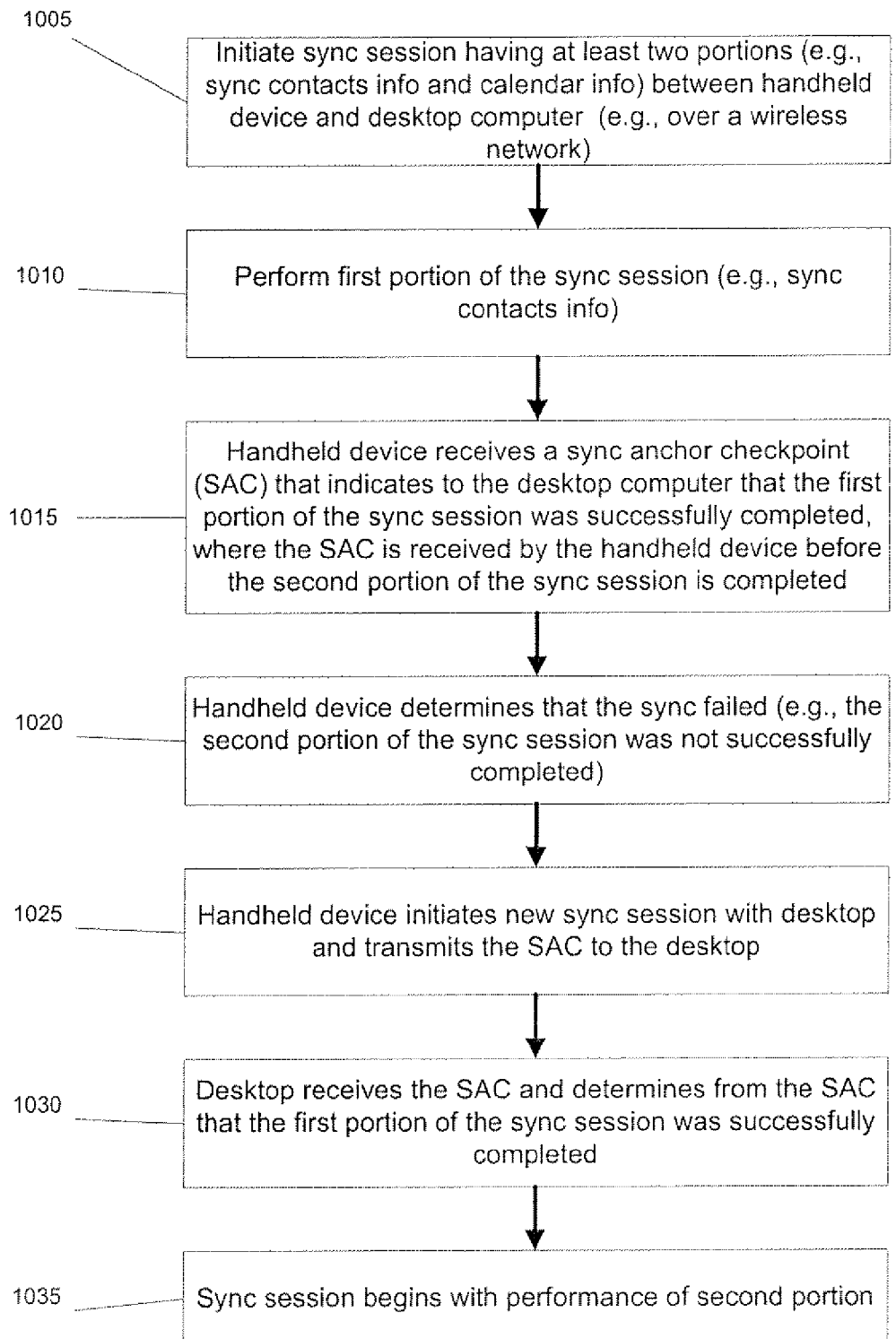
FIG. 10 is a flow chart which illustrates an embodiment of sync anchor checkpoints.

FIG. 10 is a flow chart which illustrates an embodiment of sync anchor checkpoints. At block 1005, the method initiates a sync session having at least two portions. For example, the sync session may include two dataclasses with changes to be synchronized: contacts and calendar. At block 1010, the first portion of the sync session is performed, (e.g., contacts data is synchronized). At block 1015, the device receives a sync anchor checkpoint (SAC) from the server. The SAC contains data which allows the host, at a later time, to determine that the first portion of the sync session was successfully completed. At block 1020, the device determines that the sync has failed (e.g., no sync-commit command was received from the server). At block 1025, the device initiates a new sync session with the server and transmits its most recent anchor, the SAC received at block 1015. At block 1030, the desktop receives the SAC and determines that the first portion of the synchronization was successful (e.g., the contacts changes were synchronized). At block 1035, the method begins performance of the second portion of the sync session (e.g., syncing calendar changes), without repeating the successful execution of the first portion of the sync session.

In one embodiment, a dataclass is synchronized over multiple messages. Each dataclass may be defined by its own dataclass schema. The dataclass schema may have data and relational integrity rules relevant to synchronizing the dataclass over multiple messages. For example, a contacts dataclass scheme may require a particular ordering of the entities that make up a contact, such as group membership, phone number, mailing address, etc. Data integrity rules may identify each of these entities as being required entities for a contact, and enforce the order listed above. In one embodiment, a graph may be built from a dataclass schema object model to determine how to partition the dataclass for split synchronization.

In one embodiment, each required entity in a contact may be required to be in the same portion during a split synchronization session, and each required entity may be required to be packaged in a specified order. This may be mandated by assumptions built into the data processing system that receives the message (e.g., a device may only accept a particular format for contacts). In one embodiment, increasing the granularity of a synchronization session increases the amount of state information required to support the synchronization session. For example, if the rules of data integrity specify that all required entities in a contact be packaged into the same portion, then state data tracks whether or not that contact was successfully synchronized. Alternatively, if the granularity of the session was at the entity level (e.g., name, phone number, etc.), the corresponding amount of state data would be greater. Granularity adjustments provide a means for balancing server load with session robustness.

In one embodiment, data and relational integrity rules are accommodated by determining how to partition a dataclass when a synchronization session is initiated. A synchronization session may be split into two or more portions and synchronize one or more dataclasses. The data included in each portion is determined, at least in part, by the integrity rules associated with the dataclass of which the data is a part. For example, a single dataclass, contacts, may be synchronized over two messages. As previously discussed, data and relational integrity rules influence the manner in which the dataclass can be partitioned over the two messages. Other factors may play a role, such as the reliability and bandwidth of the current connection (e.g., cellular data, wireless internet, etc.) between the device and the server or host. In other words, synchronization over a low-bandwidth, low-reliability connection may be enhanced by using more messages to synchronize a dataclass (e.g., by using more, smaller messages, the probability of a successful transmission of an individual message may increase).

A synchronization session may be defined in terms of a set of data that is to be synchronized. When the session begins, none of the set of data has been synchronized. The session may be said to end when all of the data has been synchronized. The data set may include one or more dataclasses. The synchronization mode may be fast, slow, reset, etc. The session, for each dataclass, may be split into multiple portions and the completion of each of the portions may be marked with a sync anchor checkpoint. As discussed above, when a synchronization session is initiated, the device or host partitions the data to be synchronized across the multiple portions. The portions are split using checkpoint anchors, which allow the synchronization session to resume if session was interrupted. In one embodiment, a partition of data to be synchronized is assigned to each portion of the synchronization session before the first portion of synchronization session starts.

A portion of a synchronization session may be interrupted by a loss of a connection between the device and the host, or other failure. The synchronization session may resume in response to an input from a user of the device. In one embodiment, a synchronization session resumes at the beginning of the portion of the session that was not successfully completed during the previous attempt. The beginning of the portion may be indicated by a checkpoint anchor. The anchor indicates that the previous portion of the session was successfully completed.

If synchronization resumes while the server is still maintaining the state information corresponding to the interrupted synchronization session (e.g., checkpoint anchors demarcating portions of the session), no new session is required. Rather, the interrupted synchronization session resumes, preferably at the beginning of the portion during which the interruption occurred. In one embodiment, the amount of data in each portion defines the granularity of the synchronization session's robustness (i.e., if the amount of data in the portion is large, resuming the session may re-send a large amount of data; if the amount of data in the portion is small, resuming the session may re-send a small amount of data). In one embodiment, state information for a synchronization session is removed from the host after a specified period, after which a new synchronization session is required.

If the connection between host and device is very poor, a synchronization session might last a relatively long time, during which synchronization is interrupted and resumed many times. Alternatively, if the connection is very good, the synchronization session may appear nearly instantaneous to the user and have no interruptions. The number of portions used to split the synchronization session may be influenced by the size and quantity of dataclasses to be synchronized, the rules of relational integrity of the various dataclasses, the reliability and bandwidth of the connection, and other factors. In one embodiment, the user of a device may request an increase in granularity to overcome a poor connection with the host. In one embodiment, the host may automatically increase the granularity in response to repeated failure to synchronize a portion of a session. In one embodiment, the granularity of a synchronization session (i.e., the number of portions the data to be synchronized is partitioned into) may be modified during the synchronization session (e.g., in response to an increasingly poor connection).

Figure 11:
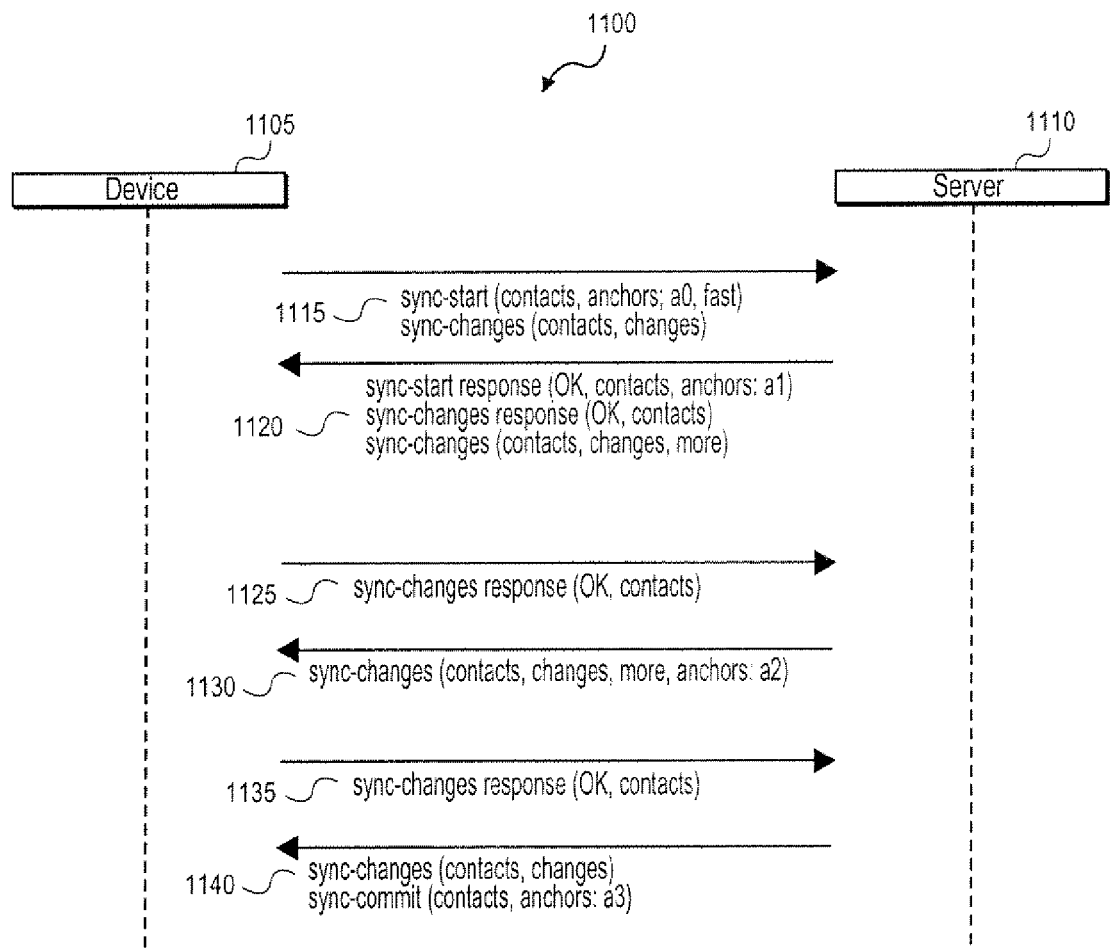
FIG. 11 is a timing diagram showing events in time between a device and a host according to one embodiment of sync anchor checkpoints.

FIG. 11 is a timing diagram showing events in time between a device and a host according to one embodiment of sync anchor checkpoints. Synchronization 1100 includes commands exchanged over time between device 1105 and server 1110. Device 1105 initiates the sync session with compressed message 1115, which includes anchors a0, which is the set of anchors device received at the termination of the previous sync session. Server 1110 responds with message 1120, which includes anchors a1 and a command indicating that the changes to the dataclass contacts is split over multiple sync-change commands. Device acknowledges in message 1125, and server 1110 sends message 1130, which contains another chunk of changes to contacts, another set of anchors, and an indicator that another chunk of contacts changes will be forthcoming. Device 1105 acknowledges with message 1135. Finally, server 1110 sends message 1140, which includes a final chunk of contacts changes and a sync-commit command terminating the synchronization and providing the device with the final set of anchors for the synchronization. Thus, at any point when device 1105 receives new anchors, if the synchronization were to fail, it may be resumed at that point during a subsequently initiated synchronization. Over an unreliable wireless connection, this incremental progress allows useful synchronization to occur without waiting for external factors (e.g., quality of connection) to change.

Multiple dataclasses may be synced in parallel. Each dataclass operates its own distinct state machine. Used with sync-phase compression as described above, all dataclasses may be synced in a single transport roundtrip by placing different commands corresponding to different dataclasses in fewer messages. Robustness and efficiency are removed by decreasing the window during which a synchronization may fail by shortening the time required for synchronization.

Figure 12:
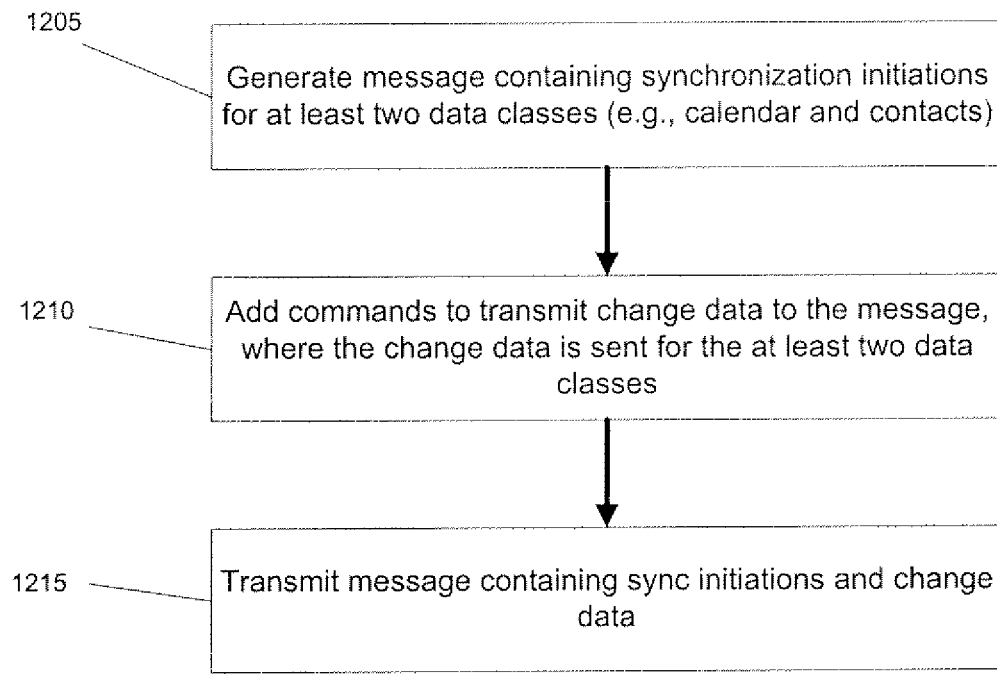
FIG. 12 is a flow chart which illustrates an embodiment of parallel dataclass synchronization.

FIG. 12 is a flow chart which illustrates an embodiment of parallel dataclass synchronization. At block 1205, the method generates a message containing synchronization initiations (e.g., sync-start commands) for at least two dataclasses (e.g., contacts, calendars, to-do items, etc.). At block 1210, the method adds sync-change commands to the message corresponding to the at least dataclasses. For each dataclass, the message contains commands compressing the negotiation and pull phases. At block 1215, the message is sent to the host, which initiates, in parallel, synchronization sessions for each of the at least two dataclasses.

Figure 13:
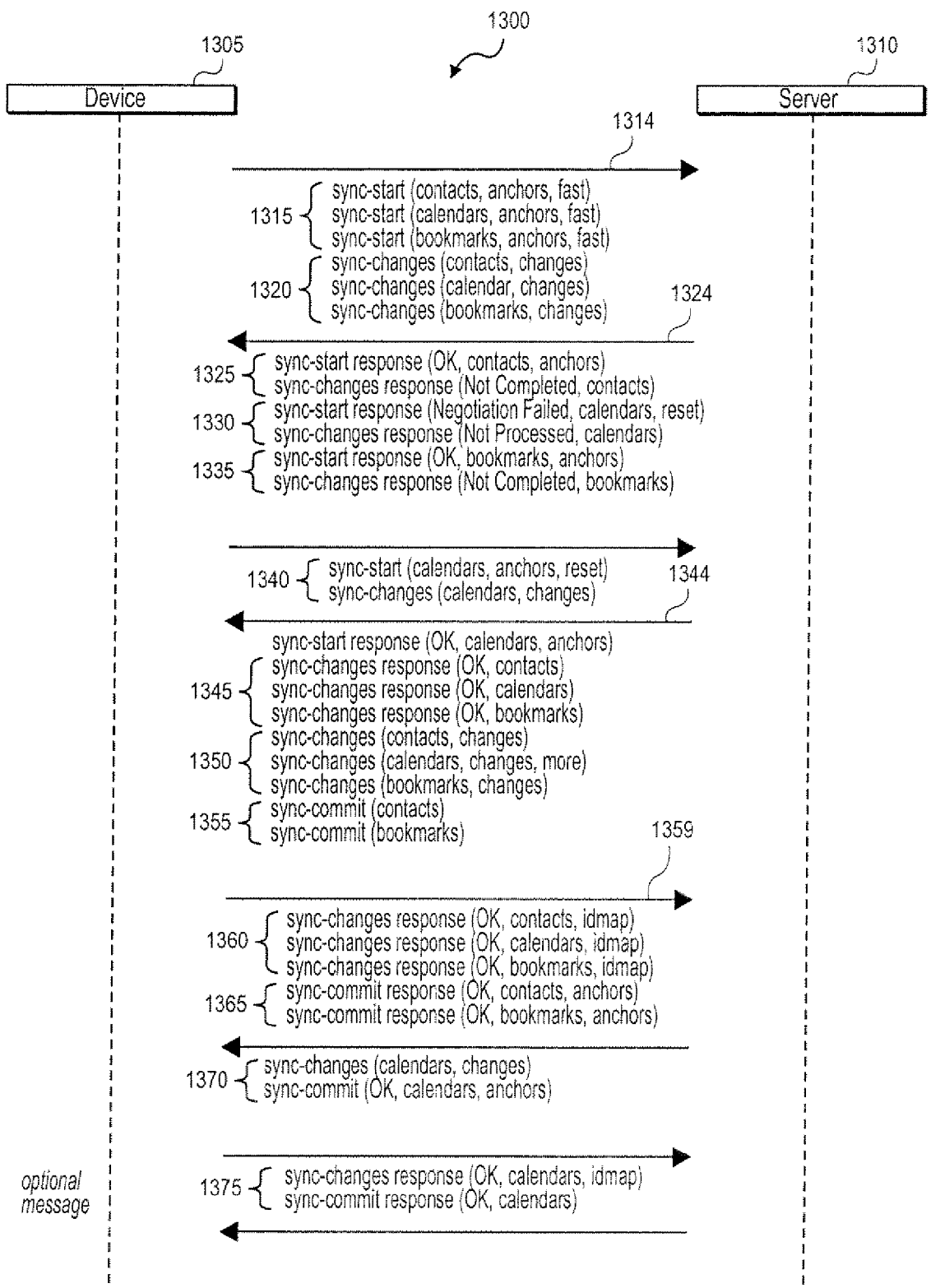
FIG. 13 is a timing diagram showing events in time between a device and a host according to one embodiment of parallel dataclass synchronization.

FIG. 13 is a flow chart showing events in time between a device and a host according to one embodiment of parallel dataclass synchronization. Synchronization 1300 includes commands exchanged over time between device 1305 and host 1310. Device 1305 initiates the synchronization session by sending message 1314 to host 1310. Message 1314 includes sync-start commands 1315 and sync-changes commands 1320 corresponding to contacts, calendars, and bookmarks. Other data types may be used instead or in addition to the types referred to in FIG. 13. In response to message 1314, server 1310 sends message 1324 to device 1305. Message 1324 contains start and change response pairs 1325, 1330, and 1335. Response pair 1325 indicates that server 1310 accepts a fast sync for the contacts dataclass and that the mingle phase has not yet completed on the server. Pair 1330 indicates that the negotiation has failed and the server will not accept first sync mode, but rather requires reset sync mode for the calendar dataclass. Pair 1335 indicates that the server acknowledges fast sync mode for bookmarks but has not completed mingling the device's changes and is not prepared to send its mingled changes to the device.

In response to message 1324, device 1305 responds with message 1340, which acknowledges server's request for a reset sync mode synchronization of the calendars dataclass. Server 1310 responds with message 1344, which acknowledges reset sync-start for the calendars dataclass. Additionally, message 1344 includes sync-changes response 1345, which provides the device with responses to all three dataclasses, indicating that the server has been able to mingle the changes from all three. Sync-changes 1350 provides change data from the server for the three dataclasses and indicates to device 1305 that more changes may be expected for the calendars dataclass (e.g., server is providing the device with all data in the calendar dataclass, since that dataclass is being reset on the device). Since dataclasses contacts and bookmarks are now synchronized, server 1310 sends sync-commit commands 1355 to the device 1305, instructing the device to store the synchronized data in its own local data store. Device 1305 responds with message 1359, which contains sync-change responses 1360, which provide the server with the idmap parameter indicating that the device intends to use its own locally unique identifiers (LUID) when referring to records on the server. Sync-commit responses 1365 indicate that the device 1305 has acknowledged server 1310's request to store synchronized data in dataclasses contacts and bookmarks. Server 1310 sends device 1305 message 1370, which contains the last of the calendar changes and instructions to commit the synchronized data. Optionally, device 1305 may send message 1375 providing the server with an idmap for the calendar dataclass, or it may defer sending the idmap until the next synchronization.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method for processing data, the method comprising:

initiating, by a first data processing system, a negotiation of synchronization mode between the first data processing system and a second data processing system, for a first data class and a second data class;

transmitting, by the first data processing system, first data representing changes to the first data class, from the first data processing system to the second data processing system, wherein the transmitting of the first data begins before completing the negotiation of the synchronization mode for the first data class;

transmitting, by the first data processing system, second data representing changes to a second data class from the first data processing system to the second data processing system, wherein transmitting the second data begins before receiving the response to the transmitting of the first data; and receiving, at the first data processing system, a response to the transmitting of the first data, the response to the transmitting of the first data comprising completing the negotiation of the synchronization mode for the first data class; and receiving, at the first data processing system, a response to the transmitting of the second data, the response to the transmitting of the second data comprising completing the negotiation of the synchronization mode for the second data class, wherein the synchronization mode for the first data class is independent of the synchronization mode for the second data class.

2. The method as in claim 1 wherein respective synchronization of the first data class and the second data class each operate according to different respective state machines.

3. The method of claim 1 wherein the first data comprises structured data in at least one of the following data classes: (a) contacts information; (b) to do information; (c) calendar information; and (d) web browsing bookmarks.

4. The method as in claim 3 wherein the first data class and the second data class belong to a plurality of data classes and wherein the plurality of data classes is synchronized in a single transport roundtrip.

5. The method as in claim 4 wherein data within each data class is independent of the data in each other data class.

6. The method as in claim 5 wherein the first data can specify no changes.

7. The method as in claim 1 wherein initiating the negotiation of the synchronization mode for a data class begins a synchronization session for the data class.

8. The method as in claim 7 wherein the synchronization session uses synchronization anchors exchanged between the first and the second data processing systems.

9. The method as in claim 8 wherein the first data comprises data changed in the first data class since a prior synchronization session.

10. A machine implemented method for processing data, the method comprising:

receiving, at a second data processing system, a negotiation of synchronization mode between the second data processing system and a first data processing system, for a first data class and a second data class;

receiving, at the second data processing system, first data representing changes to the first data class, and second data representing changes to the second data class, from the first data processing system to the second data processing system, wherein receiving the first data begins before completing the negotiation of the synchronization mode for the first data class and receiving the second data begins before completing the negotiation of the synchronization mode for the second data class and before transmitting a response to the receiving of the first data;

receiving, at the first data processing system, a response to the transmitting of the first data, the response to the transmitting of the first data comprising completing the negotiation of the synchronization mode for the first data class;

transmitting, to the first data processing system, a response to the receiving of the first data, wherein transmitting a response to the receiving of the first data comprises completing the negotiation of the synchronization mode for the first data class; and transmitting, to the first data processing system, a response to the receiving of the second data, wherein transmitting a response to the receiving of the second data comprises completing the negotiation of the synchronization mode for the second data class, wherein the synchronization mode for the first data class is independent of the synchronization mode for the second data class.

11. The method as in claim 10 wherein respective synchronization of the first data class and the second data class each operate according to different respective state machines.

12. The method of claim 10 wherein the first data comprises structured data in at least one of the following data classes: (a) contacts information; (b) to do information; (c) calendar information; and (d) web browsing bookmarks.

13. A non-transitory machine-readable storage medium storing instructions which when executed by a data processing system cause the data processing system to perform a method of processing data, the method comprising:

initiating, by a first data processing system, a synchronization session between the first data processing system and a second data processing system, wherein initiating the synchronization session comprises beginning a negotiation of a synchronization mode between the first data processing system and the second data processing system;

transmitting, by the first data processing system, first data representing changes to a first data class from the first data processing system to the second data processing system, wherein the transmitting of the first data begins before completing the negotiation of the synchronization mode for the first data class;

transmitting, by the first data processing system, second data representing changes to a second data class from the first data processing system to the second data processing system, wherein transmitting the second data begins before completing the negotiation of the synchronization mode for the first data class and before receiving the response to the transmitting of the first data;

receiving, at the first data processing system, a response to the transmitting of the first data, the response to the transmitting of the first data comprising completing the negotiation of the synchronization mode for the first data class; and receiving, at the first data processing system, a response to the transmitting of the second data, the response to the transmitting of the second data comprising completing the negotiation of the synchronization mode for the second data class, wherein the synchronization mode for the first data class is independent of the synchronization mode for the second data class.

14. The machine-readable storage medium as in claim 13 wherein respective synchronization of the first data class and the second data class each operate according to different state machines.

15. The machine-readable storage medium of claim 13 wherein the first data comprises structured data in at least one of the following data classes: (a) contacts information; (b) to do information; (c) calendar information; and (d) web browsing bookmarks.

16. The machine-readable storage medium as in claim 13 wherein the synchronization session uses synchronization anchors exchanged between the first and the second data processing systems.

17. The machine-readable storage medium as in claim 16 wherein the first data comprises data changed in the first data class since a prior synchronization session.

18. The machine-readable storage medium as in claim 17 wherein the first data class and the second data class belong to a plurality of data classes and wherein the plurality of data classes is synchronized in a single transport roundtrip.

19. The machine-readable storage medium as in claim 18 wherein data within each of the data classes is independent of the data in each other data class.

20. The machine-readable storage medium as in claim 19 wherein the first data can specify no changes.

21. A non-transitory machine-readable storage medium storing instructions which when executed by a data processing system cause the data processing system to perform a method of processing data, the method comprising:

receiving, at the second data processing system, an initiation of a synchronization session between a first data processing system and the second data processing system, the initiation of the synchronization session sent by the first data processing system, wherein the initiation comprises beginning a negotiation of a synchronization mode for a first data class and a second data class;

receiving, at the second data processing system, first data representing changes to the first data class on the first data processing system, and second data representing changes to the second data class on the first data processing system, wherein receiving the first data begins before completing the negotiation of the synchronization mode for the first data class and receiving the second data begins before completing the negotiation of the synchronization mode for the second data class and before transmitting a response to the receiving of the first data;

transmitting, to the first data processing system, a response to the receiving of the first data, wherein transmitting a response to the receiving of the first data comprises completing the negotiation of the synchronization mode for the first data class; and transmitting, to the first data processing system, a response to the receiving of the second data, wherein transmitting a response to the receiving of the second data comprises completing the negotiation of the synchronization mode for the second data class, wherein the synchronization mode for the first data class is independent of the synchronization mode for the second data class.

22. The machine-readable storage medium as in claim 21 wherein the first data comprises structured data in at least one of the following data classes: (a) contacts information; (b) to do information; (c) calendar information; and (d) web browsing bookmarks.

* * * * *